United States Patent
Ha et al.

(10) Patent No.: US 8,002,451 B2
(45) Date of Patent: Aug. 23, 2011

(54) BACKLIGHT ASSEMBLY AND DISPLAY DEVICE HAVING THE SAME

(75) Inventors: Ju-Hwa Ha, Seoul (KR); Dong-Hoon Kim, Suwon-si (KR); Joong-Hyun Kim, Suwon-si (KR); Young-Ran Son, Milyang-si (KR)

(73) Assignee: Samsung Electronics Co., Ltd. (KR)

( * ) Notice: Subject to any disclaimer, the term of this patent is extended or adjusted under 35 U.S.C. 154(b) by 234 days.

(21) Appl. No.: 12/493,310

(22) Filed: Jun. 29, 2009

(65) Prior Publication Data

US 2010/0073909 A1 Mar. 25, 2010

(30) Foreign Application Priority Data

Sep. 19, 2008 (KR) .................. 10-2008-0092253

(51) Int. Cl.
*F21V 7/04* (2006.01)
(52) U.S. Cl. ....... 362/607; 362/606; 362/620; 362/97.1; 362/558; 362/332
(58) Field of Classification Search .......... 362/606–607, 362/620, 97.1, 331, 558, 332; 359/599
See application file for complete search history.

(56) References Cited

U.S. PATENT DOCUMENTS

| 7,255,462 | B2 * | 8/2007 | Tseng | 362/330 |
| 2006/0087865 | A1 * | 4/2006 | Ha et al. | 362/607 |
| 2006/0092662 | A1 * | 5/2006 | Noh et al. | 362/607 |
| 2006/0250707 | A1 * | 11/2006 | Whitney et al. | 359/831 |
| 2006/0279953 | A1 * | 12/2006 | Kim et al. | 362/332 |

FOREIGN PATENT DOCUMENTS

| JP | 6-250182 | 9/1994 |
| KR | 10-2002-0061802 | 7/2002 |
| KR | 10-2006-0040980 | 5/2006 |
| KR | 10-2008-0021043 | 3/2008 |

* cited by examiner

*Primary Examiner* — Ali Alavi
(74) *Attorney, Agent, or Firm* — Cantor Colburn LLP

(57) ABSTRACT

A backlight assembly includes; light sources which emit light, a diffusion plate including an incident surface on which the light is incident, an exit surface which is disposed substantially opposite to the incident surface and from which the light exits, and a lens pattern which is disposed on the exit surface, and an optical sheet which overlaps the diffusion plate and includes a prism pattern on a top surface thereof, wherein each lens of the lens pattern includes a first curved portion which forms part of a curve and first linear portions which extend from both ends of the first curved portion, respectively, and each prism of the prism pattern includes a second curved portion at an apex thereof.

18 Claims, 11 Drawing Sheets

BACKLIGHT ASSEMBLY AND DISPLAY DEVICE HAVING THE SAME

This application claims priority from Korean Patent Application No. 10-2008-0092253, filed on Sep. 19, 2008, and all the benefits accruing therefrom under 35 U.S.C. §119, the contents of which in its entirety are herein incorporated by reference.

BACKGROUND OF THE INVENTION

1. Field of the Invention

The present invention relates to a display device, and more particularly, to a backlight assembly, which contributes to uniform and superior display quality by evenly distributing light from backlights, and a display device having the backlight assembly.

2. Description of the Related Art

Liquid crystal displays ("LCDs") are one of the most widely used FPDs. An LCD includes two display panels, on which electrodes are formed, and a liquid crystal layer which is interposed between the two display panels. The LCD rearranges liquid molecules of the liquid crystal layer by applying a voltage to the electrodes and thus controls the amount of light that passes through the liquid crystal layer. In this way, the LCD displays a desired image.

Being non-self-luminous, LCDs require a backlight assembly, which includes light sources, i.e., light-emitting devices, in order to display an image. Backlight assemblies provide light to a display panel from behind the display panel and function as a surface light source which provides uniform light to the entire surface of the display panel. Backlight assemblies are classified into direct-type backlight assemblies and edge-type backlight assemblies according to the position of light sources which emit light. In direct-type backlight assemblies, light sources are disposed directly under a display panel. In edge-type backlight assemblies, light sources are disposed under one or more sides of a display panel, and light emitted from the light sources is delivered to the display panel via a light guide plate.

Since light sources are disposed under a diffusion plate in direct-type backlight assemblies, bright lines can be formed. In particular, with the current trend of reducing the number of light sources, the probability of the formation of bright lines corresponding to the locations of the light sources and dark lines corresponding to the locations where light sources are not located is increasing. Furthermore, as display devices become slimmer, it is required to structure the display devices to control light sources uniformly.

BRIEF SUMMARY OF THE INVENTION

Exemplary embodiments of the present invention provide a backlight assembly which contributes to uniform and superior display quality by evenly distributing light from backlights.

Exemplary embodiments of the present invention also provide a display device having a backlight assembly which contributes to uniform and superior display quality by evenly distributing light from backlights.

However, the present invention is not restricted to the exemplary embodiments set forth herein. The above and other aspects of the present invention will become more apparent to one of ordinary skill in the art to which the present invention pertains by referencing the detailed description of the present invention given below.

According to an exemplary embodiment of the present invention, a backlight assembly includes; light sources which emit light, a diffusion plate including an incident surface on which the light is incident, an exit surface which is disposed substantially opposite to the incident surface and from which the light exits, and a lens pattern which is disposed on the exit surface, and an optical sheet which overlaps the diffusion plate and includes a prism pattern on a top surface thereof, wherein each lens of the lens pattern includes a first curved portion which forms part of a curve and first linear portions which extend from both ends of the first curved portion, respectively, and each prism of the prism pattern includes a second curved portion at an apex thereof.

According to another exemplary embodiment of the present invention a display device includes; light sources which emit light, a display panel which receives the light and displays an image, a diffusion plate interposed between the light sources and the display panel and including an incident surface on which the light is incident, an exit surface which is disposed substantially opposite to the incident surface and from which the light exits, and a lens pattern which is disposed on the exit surface; and an optical sheet which overlaps the diffusion plate and includes a prism pattern on a top surface thereof, wherein each lens of the lens pattern includes a first curved portion which forms part of a curve and first linear portions which extend from both ends of the first curved portion, respectively, and each prism of the prism pattern includes a second curved portion at an apex thereof.

In one exemplary embodiment, when a height and a pitch of the lens pattern are h1 and $P_1$, respectively, the height and the pitch of the lens pattern are constrained by the following inequality: about $0.8 \leq h1/(2 \times P_1) \leq$ about 1.35. In one exemplary embodiment, the first curved portion may be in the form of an oval. In one exemplary embodiment, a ratio of a length of a long axis of the oval to a length of a short axis of the oval may be about 2.2 to about 3.5. A length of a bottom side of a virtual isosceles triangle, which internally contacts a cross-section of each lens of the lens pattern, may be equal to the pitch of the lens pattern, and a base angle of the virtual isosceles triangle may be about 42 degrees to about 52 degrees. In one exemplary embodiment, a pitch of the prism pattern may be smaller than that of the lens pattern. In one exemplary embodiment, the pitch of the lens pattern may be about 160 μm to about 250 μm, and the pitch of the prism pattern may be about 50 μm to about 150 μm. In one exemplary embodiment, each of a second linear portion of each prism of the prism pattern may be at an angle of about 40 degrees to about 55 degrees with respect to a virtual horizontal line which connects an end of one of the second linear portions to an end of the other one of the second linear portions. In one exemplary embodiment, the second curved portion may be in the form of a circle. In one exemplary embodiment, the circle may have a radius of about 5 μm to about 10 μm. In one exemplary embodiment, each of the second linear portions may further include an uneven portion with micro-protrusions and micro-depressions. In one exemplary embodiment, each of the second linear portions may further include a diffusion pattern. In one exemplary embodiment, the incident surface may include a scattered refraction surface.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
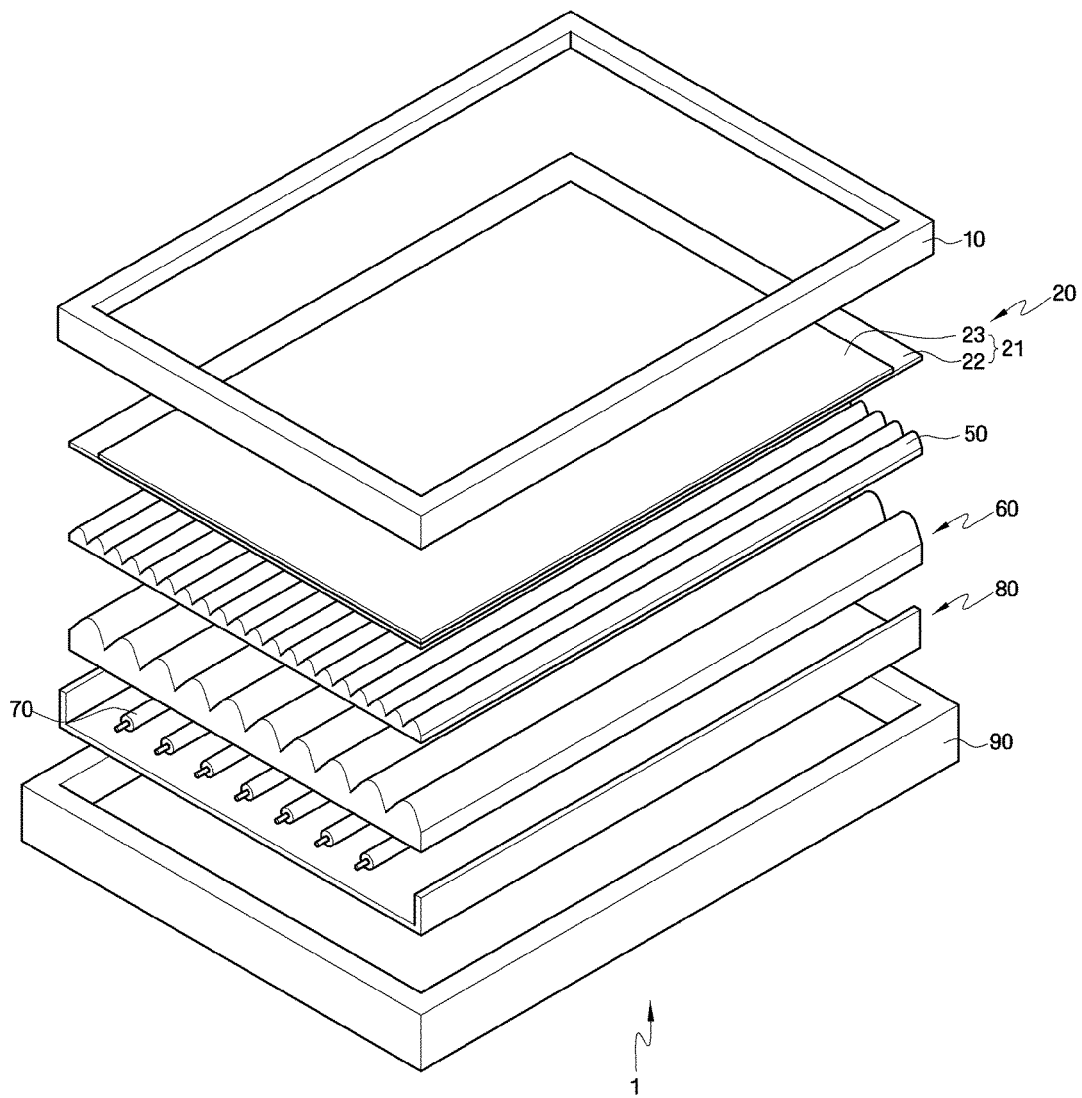
FIG. 1 is an exploded perspective view of a first exemplary embodiment of a display device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Hereinafter, a first exemplary embodiment of a display device 1 according to the present invention will be described in detail with reference to FIGS. 1 through 7. FIG. 1 is an exploded perspective view of the exemplary embodiment of the display device 1 according to the present invention. FIG.

Figure 3:
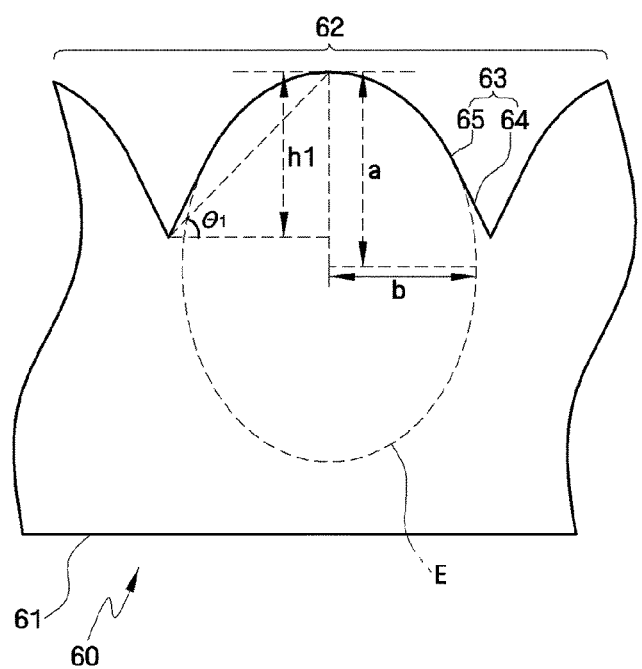
FIG. 3 is an enlarged cross-sectional view of a region A shown in FIG. 2.
Figure 4:
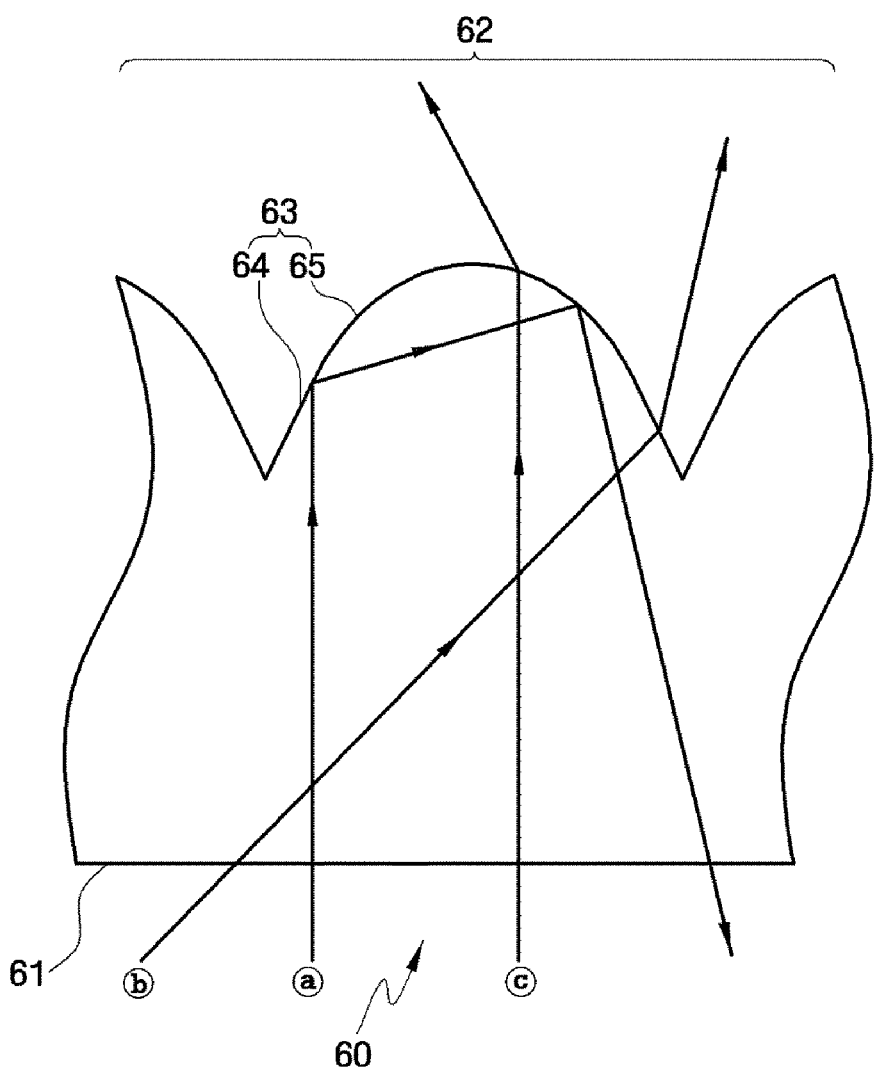
FIG. 4 is a cross-sectional view showing paths of light that enters a lens pattern of FIG. 3.
Figure 5:
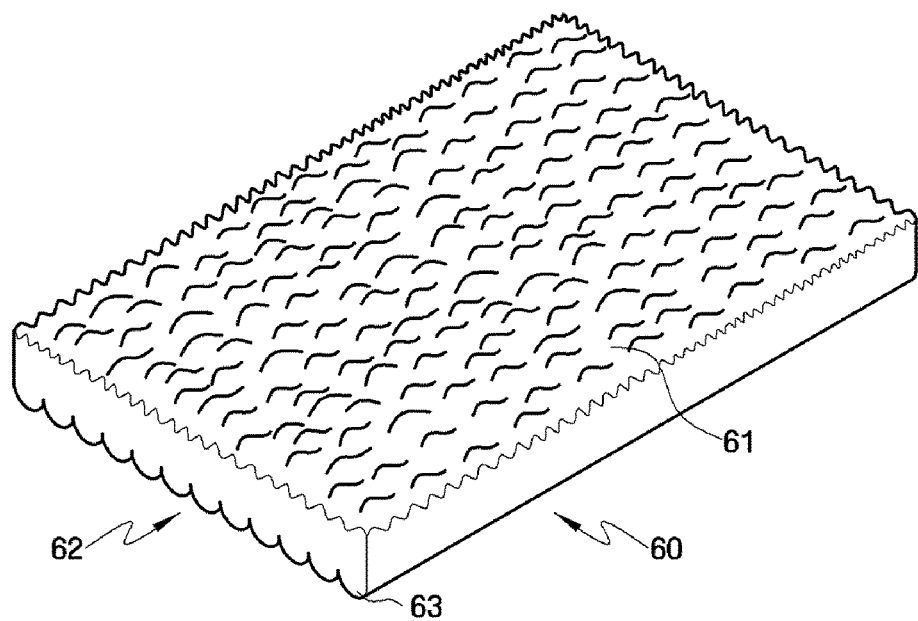
FIG. 5 is a rear perspective view of the exemplary embodiment of a diffusion plate included in the exemplary embodiment of a display device of FIG. 1.
Figure 6:
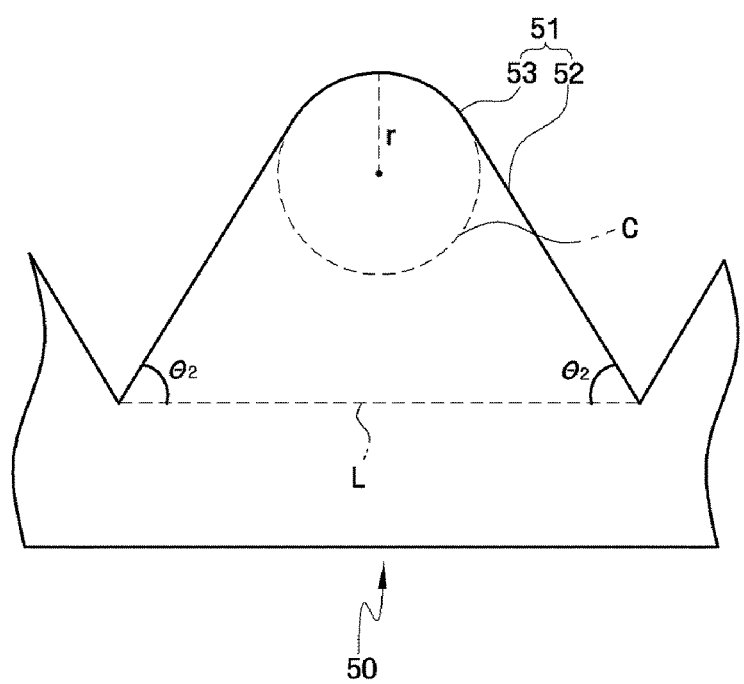
FIG. 6 is an enlarged cross-sectional view of a region B shown in FIG. 2.
Figure 7:
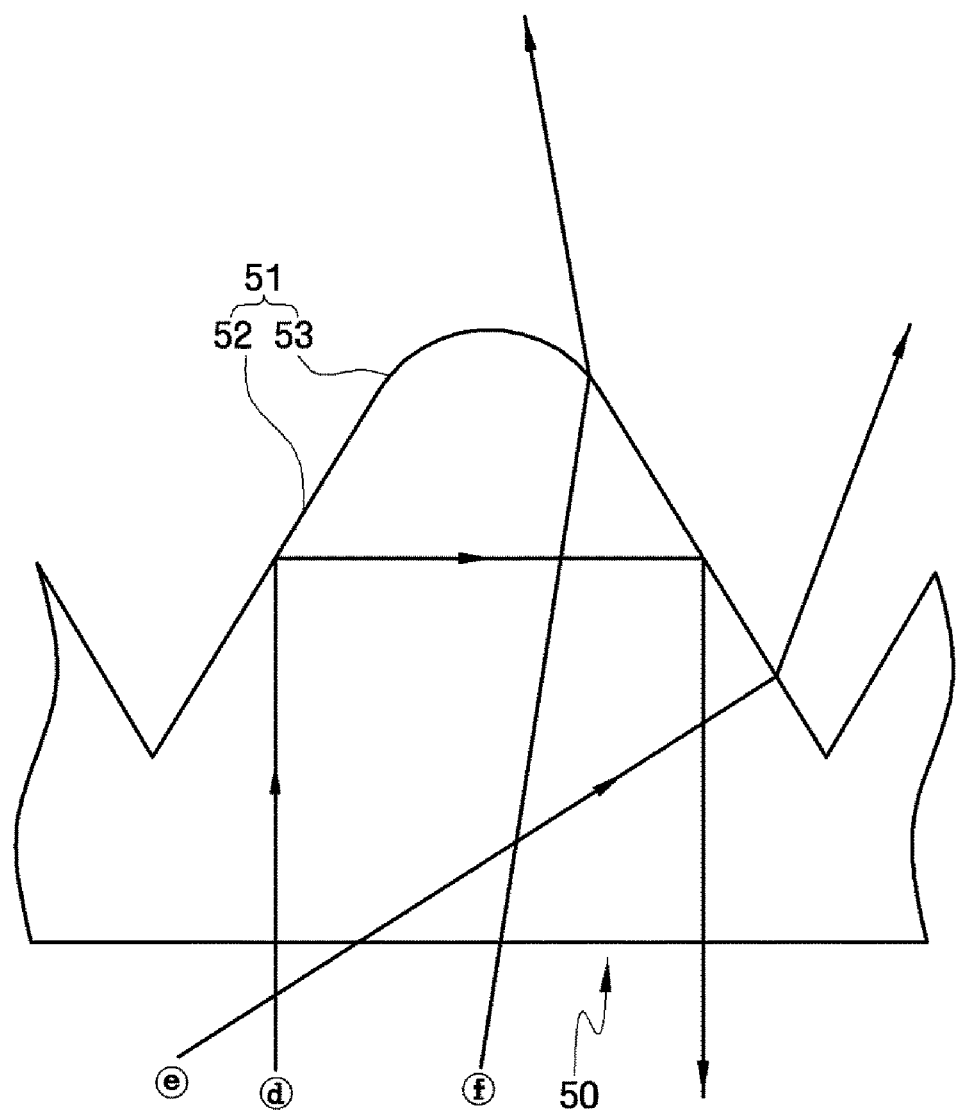
FIG. 7 is a cross-sectional view showing paths of light that enters a prism pattern of FIG. 6.
Figure 8A:
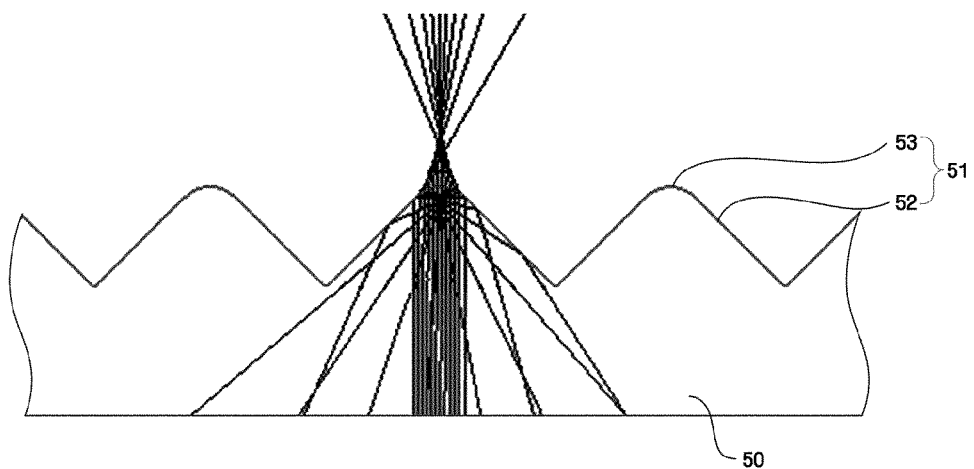
FIGS. 8A and 8B are cross-sectional views showing simulated paths of light that pass through the exemplary embodiment of an optical sheet included in the exemplary embodiment of a display device of FIG. 1.
Figure 8B:
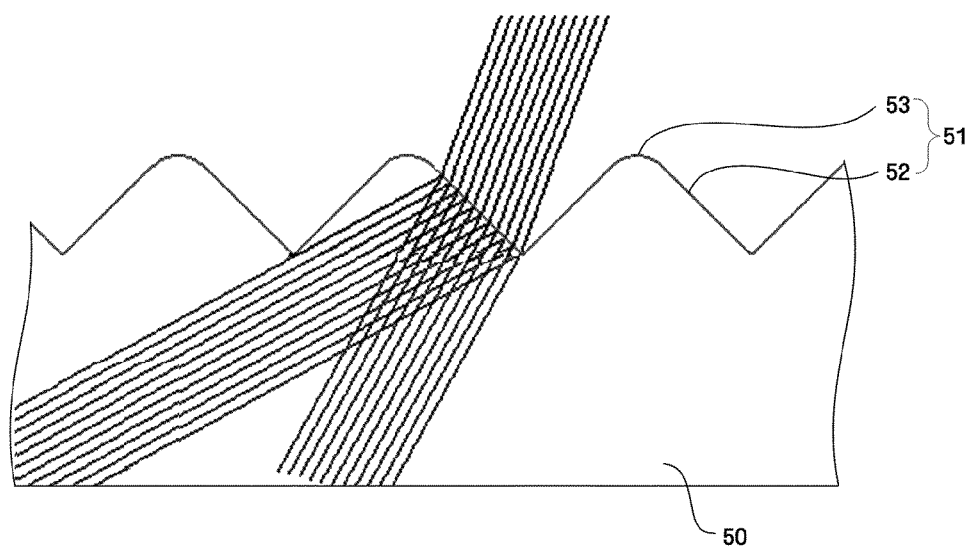
Figure 9:
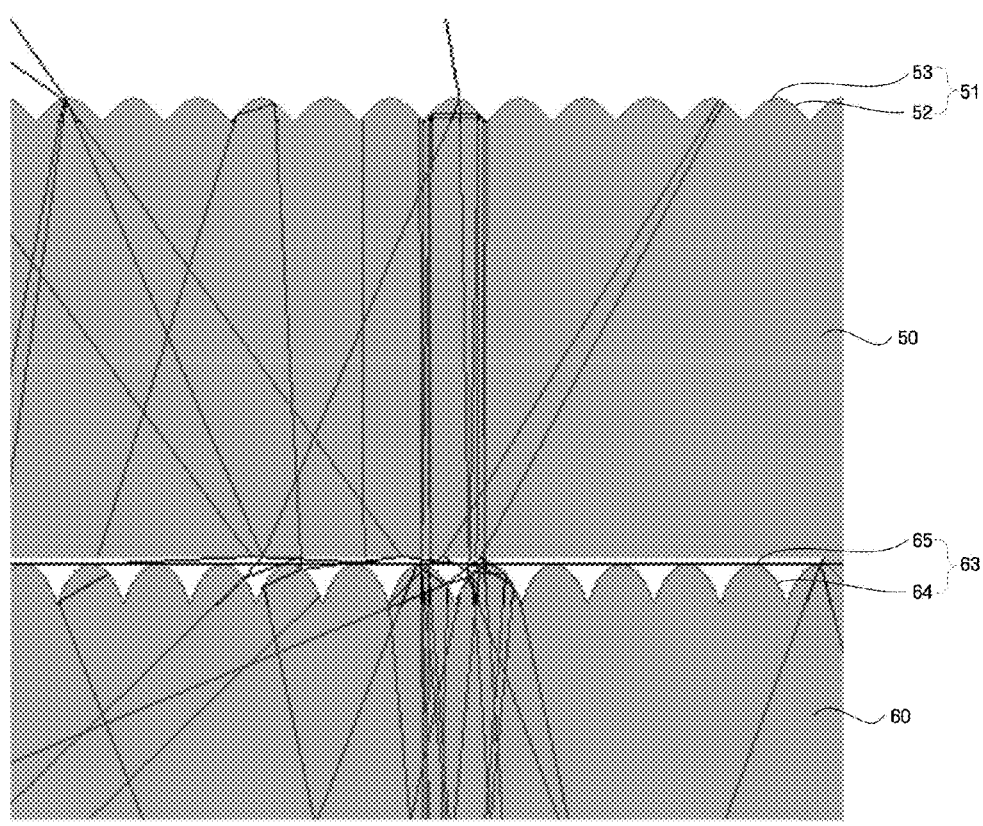
FIG. 9 is a cross-sectional view showing simulated paths of light that enters the exemplary embodiments of the diffusion plate and the optical sheet included in the exemplary embodiment of a display device of FIG. 1.

2 is a schematic cross-sectional view of exemplary embodiments of a diffusion plate 60, an optical sheet 50, light sources 70, and a reflective sheet 80 included in the exemplary embodiment of a display device 1 of FIG. 1. FIG. 3 is an enlarged cross-sectional view of a region A shown in FIG. 2. FIG. 4 is a cross-sectional view showing paths of light that enters a lens pattern 63 of FIG. 3. FIG. 5 is a rear perspective view of the exemplary embodiment of a diffusion plate 60 included in the exemplary embodiment of a display device 1 of FIG. 1. FIG. 6 is an enlarged cross-sectional view of a region B shown in FIG. 2. FIG. 7 is a cross-sectional view showing paths of light that enters a prism pattern 51 of FIG. 6. FIGS. 8A and 8B are cross-sectional views showing simulated paths of light that passes through the exemplary embodiment of an optical sheet 50 included in the exemplary embodiment of a display device 1 of FIG. 1. FIG. 9 is a cross-sectional view showing simulated paths of light that enters the exemplary embodiments of the diffusion plate 60 and the optical sheet 50 included in the exemplary embodiment of the display device 1 of FIG. 1.

Figure 2:
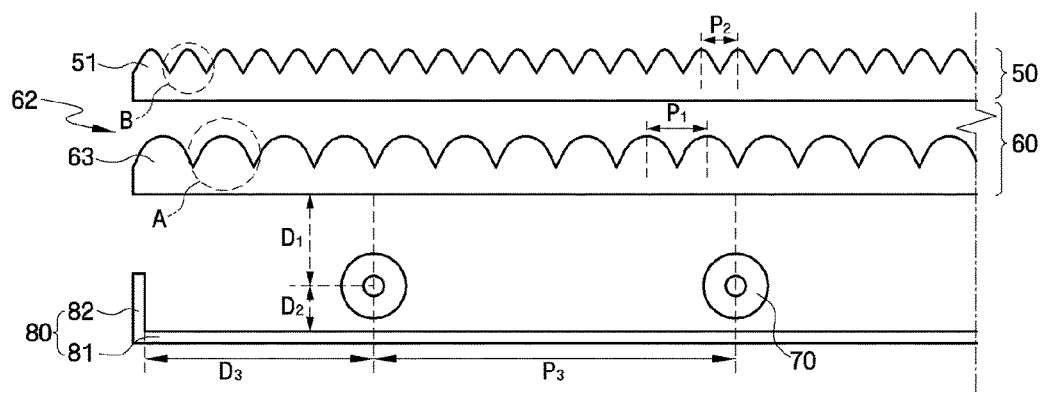
FIG. 2 is a schematic cross-sectional view of exemplary embodiments of a diffusion plate, an optical sheet, light sources, and a reflective sheet included in the exemplary embodiment of a display device of FIG. 1.

Referring to FIGS. 1 and 2, the display device 1 according to the present exemplary embodiment includes a display panel assembly 20, an upper housing 10, the optical sheet 50, the diffusion plate 60, the light sources 70, the reflective sheet 80, and a lower housing 90.

The display panel assembly 20 includes a display panel 21 which has a lower display panel 22, an upper display panel 23, and a liquid crystal layer (not shown) interposed between the lower and upper display panels 22 and 23.

The display panel 21 includes the lower display panel 22, on which gate lines (not shown), data lines (not shown) and a thin-film transistor ("TFT") array are formed, and the upper display panel 23 on which a black matrix and a common electrode are formed and which faces the lower display panel 22. The display panel 21 displays image information. Alternative exemplary embodiments may include display panels with various configurations.

The upper housing 10 forms the exterior of the display device 1 and has a space to accommodate the display panel assembly 20. In addition, an open window is formed in the center of the upper housing 10 to expose the display panel 21. The upper housing 10 is coupled to the lower housing 90.

The diffusion plate 60 diffuses light, which is emitted from the light sources 70, in a wide range of directions. The diffusion plate 60 prevents bright lines, which are formed corresponding to the shapes and positions of the light sources 70, from being seen from the front of the display device 1. The diffusion plate 60 is interposed between the display panel 21 and the light sources 70.

Referring to FIGS. 3 and 4, the diffusion plate 60 includes an incident surface 61 on which light from the light sources 70 is incident and an exit surface 62 from which the incident light exits.

In one exemplary embodiment, the diffusion plate 60 may be made of at least one of acrylic resin, styrene resin, methyl methacrylate-styrene copolymer resin, polycarbonate resin, olefin resin, a combination of the above, or other similar materials. More specifically, in one exemplary embodiment the diffusion plate 60 may be made of any one of polycarbonate ("PC"), polystyrene resin ("PS"), polyethyleneterephthalate ("PET"), polyarylate ("PAR"), polysulfone resin ("PSU"), polyehtersulfone resin ("PES"), polypropylene ("PP"), polyamide ("PA"), polyphenylene sulfide ("PPS"), polyimide resin ("PI"), polyether-ether-ketone ("PPEK"), polyurethane resin ("PUR"), polybinyl chloride ("PVC"), metylpentene polymer ("PMP"), polymethacrylate ("PMMA"), silicon resin ("SI"), acrylic resin, fluorine resin, a combination of the above, or other similar materials.

In the present exemplary embodiment, the lens pattern 63, which can effectively diffuse light, is formed on the exit surface 62 of the diffusion plate 60. The lens pattern 63 may extend in a direction substantially parallel to the light sources 70 (see FIG. 1). However, the present invention is not limited thereto. That is, alternative exemplary embodiments include configurations wherein the lens pattern 63 may also be formed as an end of an ellipsoidal lens which is repeated at regular intervals.

A cross-sectional shape of each lens of the lens pattern 63 includes first linear portions 64 and a first curved portion 65 which extends from the first linear portions 64. In the present exemplary embodiment, the first curved portion 65 may form an end of an oval, and the first linear portions 64 may extend from both ends of the first curved portion 65, respectively. The first linear portions 64 may form part of two sides of a triangle. The first linear portions 64 may be connected to the first curved portion 65 to form a shape whose lower portion is shaped like part of two sides of an isosceles triangle and whose upper portion is shaped like an end of an oval.

In the present exemplary embodiment, each lens of the lens pattern 63 may be shaped like an ellipsoidal lens whose lower portion is partially linear. Alternatively, each lens of the lens pattern 63 may be shaped like an isosceles triangle having one of its vertexes rounded in the form of an oval. Specifically, the first curved portion 65 may be shaped like a vertex of an isosceles triangle which is rounded in the shape of an oval. However, the present invention is not limited thereto. In alternative exemplary embodiments, the first curved portion 65 may be shaped like an overlap between an oval and an isosceles triangle. A point at which each of the first linear portions 64 meets the first curved portion 65 may be a point of contact between an oval and a line extending from each of the first linear portions 64.

Each of the first linear portions 64 refracts light to adjust a direction in which the light travels and totally reflects a portion of the light which is incident to the exiting surface 62 at an angle equal to or greater than a critical angle at that position on the exiting surface 62. The first curved portion 65 partially reflects and partially diffuses light.

To perform the above functions, the first linear portions 64 and the first curved portion 65 may be formed to satisfy the following requirements as illustrated in detail in FIG. 3.

When the first curved portion 65 is an end of a virtual oval, a length of a long axis of the virtual oval may be "a" while a length of a short axis of the virtual oval may be "b." In this case, a ratio (a/b) of the length "a" of the long axis to the length "b" of the short axis may be about 2.2 to about 3.5.

When the distance between every two adjacent lenses of the lens pattern 63 is defined as a pitch $P_1$ (see FIG. 2), the pitch P1 of the lens pattern 63 may be about 160 μm to about 250 μm. In addition, a height h1 of the lens pattern 63 and the pitch $P_1$ of the lens pattern 63 may satisfy the following inequality: about $0.8 \leq h1/(2 \times P_1) \leq$ about 1.35.

A length of a bottom side of a virtual isosceles triangle, which internally contacts the cross-section of each lens of the lens pattern 63, may be equal to the pitch $P_1$ of the lens pattern 63, and a base angle θ1 of the virtual isosceles triangle may be from about 42 degrees to about 52 degrees.

Various paths of light that is incident on the incident surface 61 will now be described with reference to FIG. 4. Referring to FIG. 4, light incident on the incident surface 61 may travel in a path (a) in which it is totally reflected at one of the first linear portions 64, a path (b) in which it passes through the other one of the first linear portions 64, and a path (c) in which it passes through the first curved portion 65.

Specifically, in the path (a), light is almost vertically incident upon the incident surface 61 and travels toward a corresponding one of the first linear portions 64. Then, the light is totally internally reflected at the corresponding one of the first linear portions 64 and directed toward the other one of the first linear portions 64. Again, the light is totally internally reflected at the other one of the first linear portions 64 and then exits through the incident surface 61. That is, the light totally reflected at the other one of the first linear portions 64 fails to pass through the diffusion plate 60 and is reflected downward.

In the path (b), light is obliquely incident on the incident surface 61 and travels toward a corresponding one of the first linear portions 64. Most of the light passes through the corresponding one of the first linear portions 64 while part of the light is reflected at the corresponding one of the first linear portions 64. Here, since a refractive index of the diffusion plate 60 is greater than that of air, light that passed through the corresponding one of the first linear portions 64 is refracted upward. As the difference between the refractive index of the diffusion plate 60 and that of air is increased, a refraction angle of the light may increase. In this way, light, which is obliquely incident upon the incident surface 61 and travels toward one of the first linear portions 64 of the diffusion plate 60, is concentrated to the display panel 21 (see FIG. 1) as it passes through the lens pattern 63.

In the path (c), light is almost vertically incident on the incident surface 61 and travels toward the first curved portion 65. Then, the light passes through the first curved portion 65. Here, since the first curved portion 65 is formed in the shape of an end of an oval, a tangent line to the first curved portion 65, through which light passes, varies. Accordingly, a refraction angle of light varies, and light is diffused in various directions as it passes through the first curved portion 65. In the path (c), part of light is reflected at the first curved portion 65. However, most of the light passes through the first curved portion 65 and is diffused.

The shape of the incident surface 61 of the diffusion plate 60 will now be described with reference to FIG. 5. Referring to FIG. 5, a rear surface of the diffusion plate 60 is the incident surface 61. In one exemplary embodiment, the incident surface 61 may include a scattered refraction surface (not shown in FIGS. 2-4). The scattered refraction surface denotes a surface which scatters and refracts incident light in random directions. In one exemplary embodiment, the scattered refraction surface may include an irregular curved surface, particles disposed on the incident surface 61 or within the diffusion plate 60, or openings. When the incident surface 61 is the scattered refraction surface, a moiré pattern can be prevented from being formed on the display panel 21 (see FIG. 1) due to the interference of light which may be caused by a regular shape or pattern of the diffusion plate 60. In one exemplary embodiment, the incident surface 61 may have a moiré pattern. However, the present invention is not limited thereto. That is, the incident surface 61 may also have irregular, uneven patterns according to various exemplary embodiments of the present invention. The incident surface 61 may have a roughness of about 4 μm to about 10 μm.

Referring to FIGS. 1, 2 and 6, the optical sheet 50 is interposed between the diffusion plate 60 and the display panel 21. The optical sheet 50 concentrates light from the diffusion plate 60 to the display panel 21. In the present exemplary embodiment, the optical sheet 50 overlaps the diffusion plate 60.

The prism pattern 51 is formed on a top surface of the optical sheet 50. In the present exemplary embodiment, the prism pattern 51 extends substantially parallel to the light sources 70 (see FIG. 1). A cross-sectional shape of each prism of the prism pattern 51 includes second linear portions 52 and a second curved portion 53 which extends from the second linear portions 52. In the present exemplary embodiment, the second linear portions 52 form part of two sides of an isosceles triangle, and the second curved portion 53 forms an end of another virtual oval, which in one exemplary embodiment may be a virtual circle C.

The second linear portions 52 may be connected to the second curved portion 53 to form a shape whose lower portion is shaped like part of two sides of an isosceles triangle and whose upper portion is shaped like an end of a circle. That is, each prism of the prism pattern 51 includes a curved corner, i.e., the second curved portion 53. Specifically, the second curved portion 65 may be shaped like a vertex of an isosceles triangle which is rounded in the form of a circle. However, the shape of the second curved portion 53 may not be limited to an end of a circle. That is, in alternative exemplary embodiments the second curved portion 53 may also be shaped like part of various curves, such as an oval and a parabola.

Each of the second linear portions 52 refracts light to adjust a direction in which the light travels. The optical sheet 50 concentrates light, which is obliquely incident thereon, upward. The second curved portion 53 diffuses light over a wide area. The second curved portion 53 passes light incident from directly under the optical sheet 50. Unlike in the present exemplary embodiment, if the prism pattern 51 of the optical sheet 50 (e.g., a prism sheet) is shaped like an array of triangular prisms without curved portions, light incident on the optical sheet 50 from directly under the optical sheet 50 may exit downward through a bottom surface of the optical sheet 50. Therefore, darkportions may be formed on the optical sheet 50.

However, in the present exemplary embodiment, most of the light incident on the optical sheet 50 is concentrated to the display panel 21 as it passes through the second linear portions 52 and the second curved portion 53, so that it can uniformly reach the entire surface of the display panel 21.

A pitch $P_2$ of the prism pattern 51, which is the distance between every two adjacent prisms of the prism pattern 51, may be about 50 μm to about 150 μm. In one exemplary embodiment, the pitch $P_2$ of the prism pattern 51 may be smaller than the pitch $P_1$ of the lens pattern 63.

In one exemplary embodiment, each of the second linear portions 52 of each prism of the prism pattern 51 may be at an angle of about 40 degrees to about 55 degrees with respect to a virtual horizontal surface L which is parallel to the display panel 21 or to a light incident surface of the optical sheet 50. In one exemplary embodiment, the virtual circle C, an end of which forms the second curved portion 53, may have a radius "r" of about 5 μm to about 10 μm.

In one exemplary embodiment, the direction in which the prism pattern 51 of the optical sheet 50 extends may be substantially the same as the direction in which the lens pattern 63 of the diffusion plate 60 extends.

In one exemplary embodiment, the optical sheet 50 may be thinner than the diffusion plate 60. That is, since the diffusion plate 60 can fully function as a support on which the optical sheet 50 is disposed, the optical sheet 50 may be made of a flexible material.

Various paths of light that enters the prism pattern 51 will now be described with reference to FIG. 7. Referring to FIG. 7, light incident on the optical sheet 50 may travel in a path (d) in which it is totally internally reflected at one of the second linear portions 52, a path (e) in which it passes through the other one of the second linear portions 52, and a path (f) in which it passes through the second curved portion 53.

Specifically, in the path (d), light is almost vertically incident on the optical sheet 50 and travels toward a corresponding one of the second linear portions 52. Then, the light is totally internally reflected at the corresponding one of the second linear portions 52 and directed toward the other one of the second linear portions 52. Again, the light is totally internally reflected at the other one of the second linear portions 52 and then exits downward through the bottom surface of the optical sheet 50. That is, the light totally internally reflected at the other one of the second linear portions 52 fails to pass through the optical sheet 50 and is reflected downward.

In the path (e), light is obliquely incident on the optical sheet 50 and travels toward a corresponding one of the second linear portions 52. Most of the light passes through the corresponding one of the second linear portions 52 while part of the light is reflected at the corresponding one of the second linear portions 52. Here, since a refractive index of the optical sheet 50 is greater than that of air, light that passed through the corresponding one of the second linear portions 52 is refracted upward.

In the path (f), light is almost vertically incident on the optical sheet 50 and travels toward the second curved portion 53. Then, the light passes through the second curved portion 53. Here, since the second curved portion 53 forms an end of a circle, a tangent line to the second curved portion 53, through which light passes, varies. Accordingly, a refraction angle of light varies, and light is diffused in various directions as it passes through the second curved portion 53. In the path (f), part of light is reflected at the second curved portion 53. However, most of the light passes through the second curved portion 53 and is diffused.

Referring to FIG. 8A, out of all of the light vertically incident on the bottom surface of the optical sheet 50, the light that travels toward the second curved portion 53 of each prism of the prism pattern 51 is diffused by the second curved portion 53 as it passes through the second curved portion 53.

Unlike in the present exemplary embodiment, when the cross-section of each prism of a prism pattern is shaped like an isosceles triangle, lacking the second curved portion 53, light vertically incident on a bottom side of the isosceles triangle is retro-reflected and thus output in a direction substantially parallel to the direction in which the light is incident on the bottom side of the isosceles triangle. If such a prism pattern is disposed directly above the light sources 70, the amount of light, which exits from the prism pattern, is significantly reduced. Accordingly, dark portions may be formed around the light sources 70. To prevent the formation of the dark portions, in the present exemplary embodiment the second curved portion 53 is formed in each prism of the prism pattern 51. Thus, the luminance uniformity of light output from the light sources 70 can be maintained.

Referring to FIG. 8B, light obliquely incident on the bottom surface of the optical sheet 50 passes through a corresponding one of the second linear portions 52 of each prism of the prism pattern 51. Here, a portion of the light passes through the corresponding one of the second linear portions 52 while part of the light is reflected at the corresponding one of the second linear portions 52 and travels downward. In this way, part of light, which arrives at a corresponding one of the second linear portions 52, passes through the corresponding one of the second linear portions 52 and travels upward while part of the light exits downward through the bottom surface of the optical sheet 50, is reflected by the reflective sheet 80 (see FIG. 1), and then is incident again on the optical sheet 50. As light travels in many different paths, the overall luminance uniformity of light output from the optical sheet 50 is increased.

A process in which light from the light sources 70 passes through the diffusion plate 60 and the optical sheet 50 will now be described in detail with reference to FIG. 9.

Referring to FIG. 9, light emitted from the light sources 70 is incident on the incident surface 61 of the diffusion plate 60. Here, the luminance of the incident light significantly varies according to the position on the diffusion plate 60. That is, the luminance of the incident light is highest in a region adjacent to the light sources 70 while it is low in an area between the light sources 70.

In particular, of light incident on the diffusion plate 60, light vertically incident on the diffusion plate 60 has a substantially increased luminance. This is because light vertically incident on the diffusion plate 60 can reach a region disposed directly above the light sources 70.

Light incident on the diffusion plate 60 is diffused in various directions as it passes through the lens pattern 63. In one exemplary embodiment, the diffusion plate 60 includes elements that can scatter light, such as scattering particles and openings (e.g., voids which may be spherical in shape and filled either with a vacuum or with air or other materials). The scattering particles blur light rather than changing a main path of the light. On the other hand, the lens pattern 63 changes a main path of incident light to diffuse the incident light in various directions. Since the lens pattern 63 is partially curved, light can be diffused in various directions. In addition, the luminance uniformity of light can be provided by varying the shape of the first curved portion 65 of the lens pattern 63.

Light that passed through the diffusion plate 60 is incident on the optical sheet 50. The light incident on the optical sheet 50 has better luminance uniformity than light incident on the diffusion plate 60. Of the light incident on the optical sheet 50, part of light vertically incident on the prism pattern 51 is retro-reflected while part of the vertically incident light passes through the prism pattern 51. Here, the luminance of the light vertically incident on the prism pattern 51 is lower than that of light initially output from the light sources 70. Therefore, in one exemplary embodiment, the second curved portion 53 of each prism of the prism pattern 51 may be smaller than the first curved portion 65 of each lens of the lens pattern 63.

When both of the diffusion plate 60 and the optical sheet 50 are used as described above, the luminance uniformity of the light sources 70 can be significantly enhanced. In addition, sufficient luminance uniformity can be provided even when the distance between the light sources 70 and the diffusion plate 60 is significantly reduced. Thus, the overall thickness of the display device 1 can be dramatically reduced.

Meanwhile, in one exemplary embodiment, a pair of diffusion sheets (not shown) may further be installed between the optical sheet 50 and the display panel 21. The diffusion sheets may diffuse light that passed through the optical sheet 50 and may overlap each other.

The light sources 70, which emit light, are disposed under the diffusion plate 60. The light sources 70 generate light and provides the generated light to the display panel 21. Exemplary embodiments of the light sources 70 may include linear-shaped light sources, such as cold cathode fluorescent lamps ("CCFLs") and hot cathode fluorescent lamps ("HCFLs"), or point light sources such as light-emitting diodes ("LED").

The present exemplary embodiment of a display device 1 according to the present invention may use lamps, which are linear-shaped light sources, as the light sources 70. In addition, the light sources 70 may extend substantially parallel to each other in the same direction as the lens pattern 63 of the diffusion plate 60 and the prism pattern 51 of the optical sheet 50.

As shown in FIG. 2, a pitch $P_3$, which is the distance between the light sources 70 (e.g., lamps), may be maintained at about 22 mm to about 30 mm, and a distance $D_1$ between the center of each of the light sources 70 and the diffusion plate 60 may be about 4.5 mm to about 7.5 mm.

The reflective sheet 80 is disposed under the light sources 70 and reflects light, which is emitted downward from the light sources 70, upward to enhance light efficiency. The reflective sheet 80 includes a bottom portion 81, which is disposed under the light sources 70, and a pair of bent portions 82 which respectively protrude upward from opposite edges of the reflective sheet 80. The bottom portion 81 is disposed under the light sources 70 and reflects light, which is emitted downward from the light sources 70, upward. The bent portions 82 extend upward from the bottom portion 81 along at least two sides of the lower housing 90. The bent portions 82 are disposed on at least the two sides of the lower housing 90 which extend in a direction substantially parallel to a direction of extension of the light sources 70 and reflect light that is laterally emitted from the light sources 70.

When the light sources 70 are lamps, the distance between the center of each lamp and the reflective sheet 80 may be about 3 mm to about 5 mm, and the minimum distance between each lamp and each of the bent portions 82 of the reflective sheet 80 may be about 0.5 to about 2.5 times the distance between the lamps.

Figure 10:
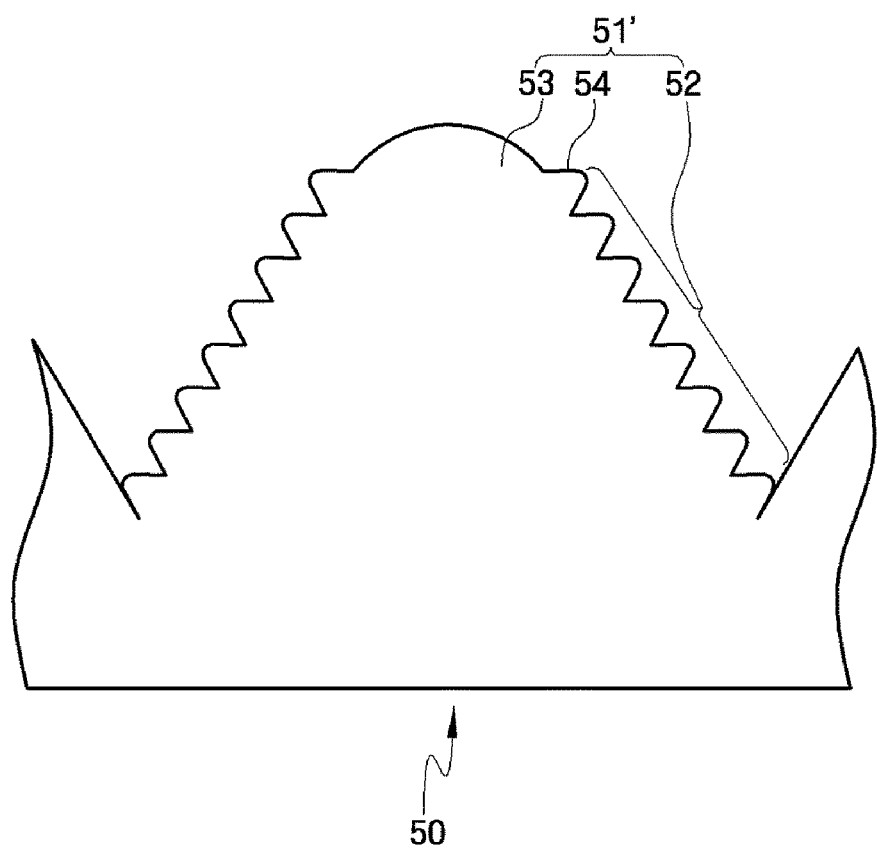
FIG. 10 is a first modified exemplary embodiment of the prism pattern shown in FIG. 7.
Figure 11:
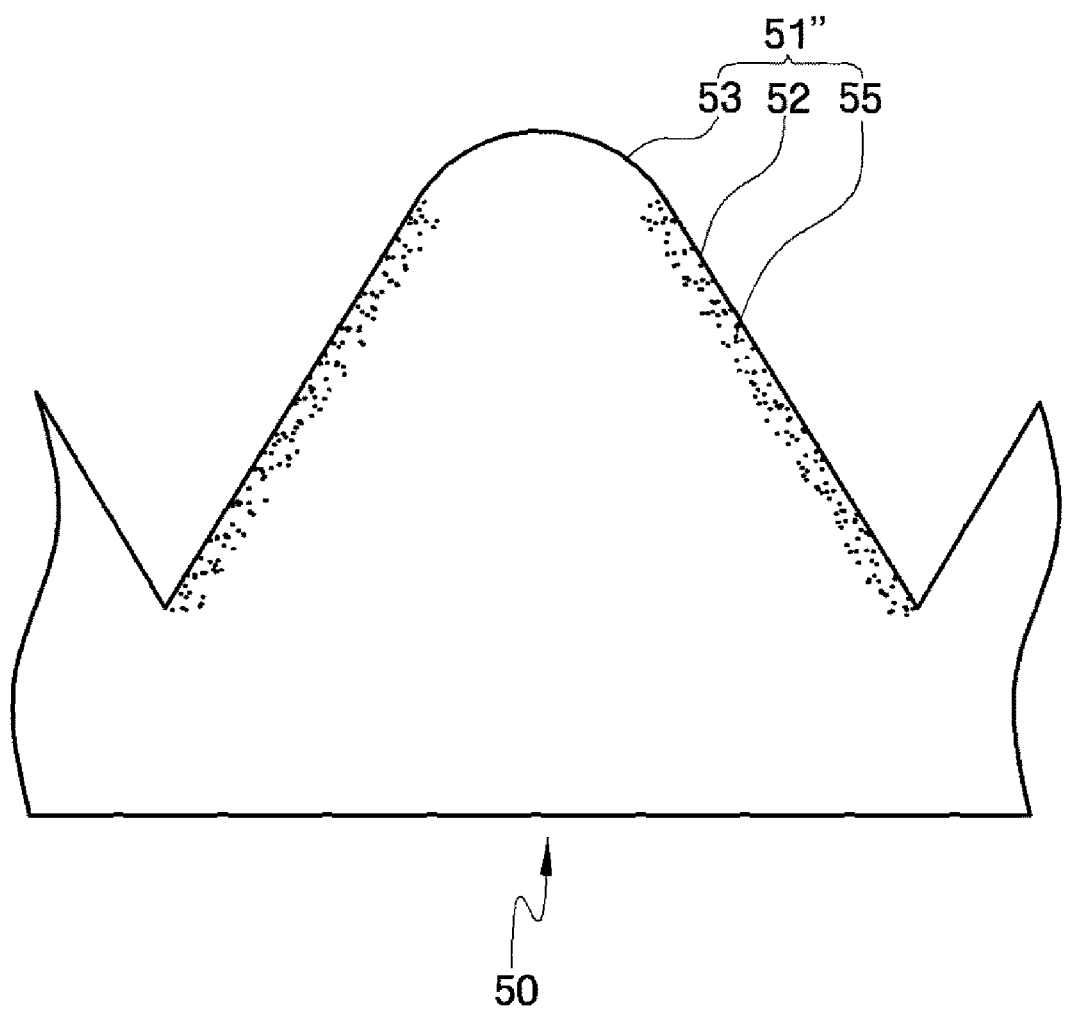
FIG. 11 is a second modified exemplary embodiment of the prism pattern shown FIG. 7.

Hereinafter, modified exemplary embodiments of the optical sheet 50 included in the first exemplary embodiment of a display device 1 according to the present invention will be described in detail with reference to FIGS. 10 and 11. FIG. 10 is a first modified exemplary embodiment of the prism pattern 51 shown in FIG. 7. FIG. 11 is a second modified exemplary embodiment of the prism pattern 51 shown FIG. 7.

Referring to FIG. 10, an optical sheet 50 according to the first modified exemplary embodiment includes second linear portions 52, each having an uneven portion 54 with micro-protrusions and micro-depressions. Specifically, each prism of a prism pattern 51' of the optical sheet 50 according to the first modified exemplary embodiment includes the second linear portions 52 and a second curved portion 53. Each of the second linear portions 52 includes the uneven portion 54. Exemplary embodiments include configurations wherein the uneven portion 54 may be formed by molding or mechanical processing. The uneven portion 54 may be formed by very slightly vibrating the optical sheet 50 in a stretching process. The uneven portion 54 diffuses light incident thereon.

Although each of the second linear portions 52 includes the micro uneven portion 54, the linear portion 52 extends substantially in a linear direction. Thus, each of the second linear portions 52 can refract light and concentrate the light to the display panel 21. In addition, since the uneven portion 54 partially diffuses light, the uniformity of light provided to the display panel 21 can be increased. Consequently, uniform light can be provided to the entire surface of the display panel 21.

Referring to FIG. 11, an optical sheet 50 according to the second modified exemplary embodiment includes second linear portions 52, each having a micro-diffusion pattern 55. Specifically, each prism of a prism pattern 51" of the optical sheet 50 according to the second modified exemplary embodiment includes the micro-diffusion pattern 55 which performs substantially the same function as the uneven portion 54 (see FIG. 8) of the optical sheet 50 according to the first modified exemplary embodiment. That is, since each of the second linear portions 52 includes the micro-diffusion pattern 55, it can refract light that passes therethrough and concentrate the light to the display panel 21. In addition, since the micro-diffusion pattern 55 partially diffuses light, the uniformity of light provided to the display panel 21 can be increased. Consequently, uniform light can be provided to the entire surface of the display panel 21.

Figure 12:
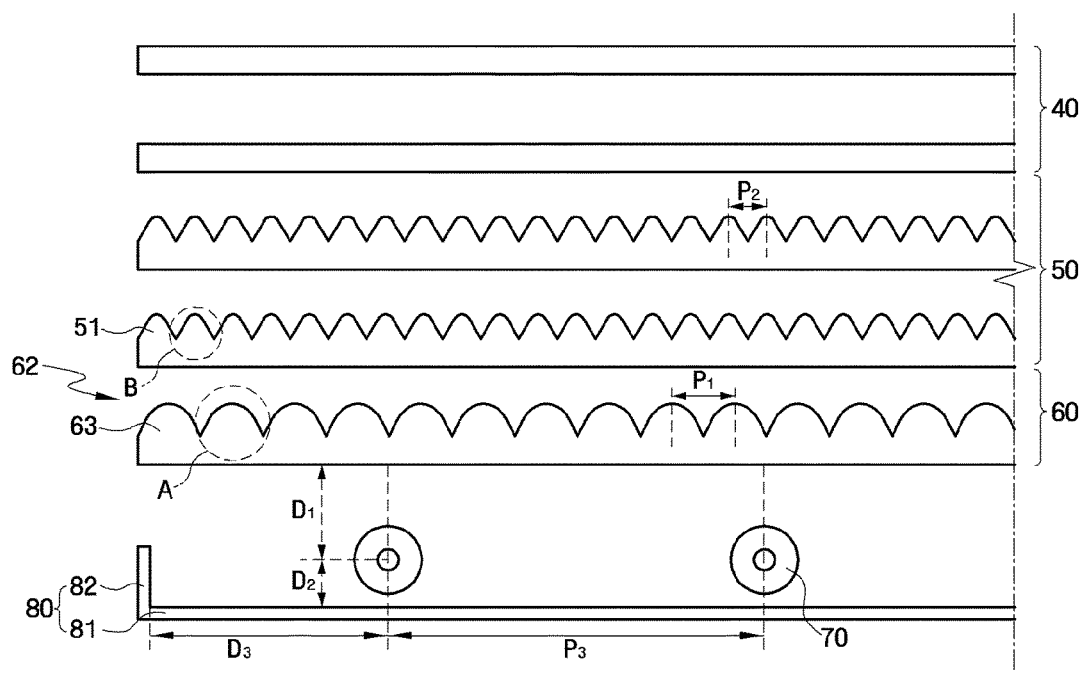
FIG. 12 is a schematic cross-sectional view of exemplary embodiments of a diffusion plate, a pair of first optical sheets, a pair of second optical sheets, light sources, and a reflective sheet included in a second exemplary embodiment of a display device according to the present invention.
Figure 13:
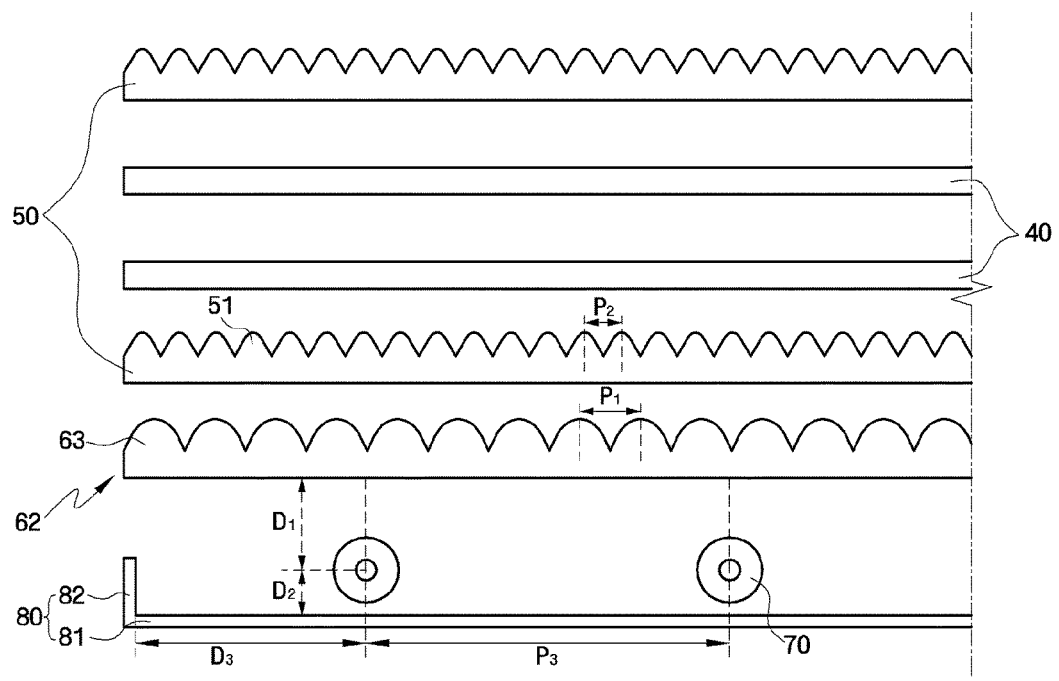
FIG. 13 is a schematic cross-sectional view of exemplary embodiments of a diffusion plate, a pair of first optical sheets, a pair of second optical sheets, light sources, and a reflective sheet included in a modified exemplary embodiment of the second exemplary embodiment of a display device shown in FIG. 12.

Hereinafter, a second exemplary embodiment of a display device according to the present invention will be described in detail with reference to FIGS. 12 and 13. FIG. 12 is a schematic cross-sectional view of exemplary embodiments of a diffusion plate 60, a pair of first optical sheets 50, a pair of second optical sheets 40, light sources 70, and a reflective sheet 80 included in the display device according to the present invention. FIG. 13 is a schematic cross-sectional view of exemplary embodiments of a diffusion plate 62, a pair of first optical sheets 50, a pair of second optical sheets 40, light sources 70, and a reflective sheet 80 included in a modified exemplary embodiment of the second exemplary embodiment of a display device shown in FIG. 12. For simplicity, elements having the same functions as those illustrated in the drawings for the first exemplary embodiment are indicated by like reference numerals, and thus their description will be omitted.

Referring to FIG. 12, the second exemplary embodiment of a display device includes the two first optical sheets 50 and the two second optical sheets 40. Here, each of the first optical sheets 50 includes a prism pattern 51 which extends substantially parallel to the light sources 70. In one exemplary embodiment, the respective prism patterns 51 of the first optical sheets 50 may face in the same direction.

The second optical sheets 40 are diffusion sheets and diffuse light that passed through the first optical sheets 50. In one exemplary embodiment, the second optical sheets 40 may overlap each other.

The first optical sheets 50 and the second optical sheets 40 may be sequentially arranged as shown in FIG. 12. Alternatively, the pair of the second optical sheets 40 may be interposed between the first optical sheets 50 as shown in FIG. 13.

However, the pair of the second optical sheets 40 may not necessarily be disposed between the first optical sheets 50. That is, alternative exemplary embodiments also include configurations wherein each of the first optical sheets 50 and each of the second optical sheets 40 may be disposed in an alternating fashion. The prism pattern 51 of each of the first optical sheets 50, a lens pattern 63 of the diffusion plate 60, and lamps, e.g., the light sources 70, may extend in substantially the same direction.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:
1. A backlight assembly comprising:
light sources which emit light;
a diffusion plate comprising an incident surface on which the light is incident, an exit surface which is disposed opposite to the incident surface and from which the light exits, and a lens pattern which is disposed on the exit surface; and
an optical sheet which overlaps the diffusion plate and comprises a prism pattern on a top surface thereof, wherein each lens of the lens pattern comprises a first curved portion which forms part of a curve and first linear portions which extend from both ends of the first curved portion, respectively, and each prism of the prism pattern comprises a second curved portion at an apex thereof.

2. The backlight assembly of claim 1, wherein when a height and a pitch of the lens pattern are h1 and $P_1$, respectively, the height and pitch of the lens pattern are constrained by the following inequality: about $0.8 \leq h1/(2 \times P_1) \leq$ about 1.35.

3. The backlight assembly of claim 2, wherein the first curved portion is shaped like an end of an oval.

4. The backlight assembly of claim 3, wherein a ratio of a length of a long axis of the oval to a length of a short axis of the oval is about 2.2 to about 3.5.

5. The backlight assembly of claim 2, wherein a length of a bottom side of a virtual isosceles triangle, which internally contacts a cross-section of each lens of the lens pattern, is equal to the pitch of the lens pattern, and a base angle of the virtual isosceles triangle is about 42 degrees to about 52 degrees.

6. The backlight assembly of claim 1, wherein a pitch of the prism pattern is smaller than that of the lens pattern.

7. The backlight assembly of claim 6, wherein the pitch of the lens pattern is about 160 μm to about 250 μm, and the pitch of the prism pattern is about 50 μm to about 150 μm.

8. The backlight assembly of claim 1, wherein each of a second linear portion of each prism of the prism pattern is disposed at an angle of about 40 degrees to about 55 degrees with respect to a virtual horizontal line which connects an end of one of the second linear portions to an end of the other one of the second linear portions.

9. The backlight assembly of claim 8, wherein the second curved portion is shaped like an end of a circle.

10. The backlight assembly of claim 9, wherein the circle has a radius of about 5 μm to about 10 μm.

11. The backlight assembly of claim 1, wherein each of the second linear portions further comprises an uneven portion having micro-protrusions and micro-depressions formed thereon.

12. The backlight assembly of claim 1, wherein each of the second linear portions further comprises a diffusion pattern.

13. The backlight assembly of claim 1, wherein the incident surface comprises a scattered refraction surface.

14. A display device comprising:
light sources which emit light;
a display panel which receives the light and displays an image;
a diffusion plate interposed between the light sources and the display panel and comprising an incident surface on which the light is incident, an exit surface which is disposed substantially opposite to the incident surface and from which the light exits, and a lens pattern which is disposed on the exit surface; and
an optical sheet which overlaps the diffusion plate and comprises a prism pattern on a top surface thereof,
wherein each lens of the lens pattern comprises a first curved portion which forms part of a curve and first linear portions which extend from both ends of the first curved portion, respectively, and each prism of the prism pattern comprises a second curved portion at an apex thereof.

15. The display device of claim 14, wherein when a height and a pitch of the lens pattern are h1 and $P_1$, respectively, the height and pitch of the lens pattern are constrained by the following inequality: about $0.8 \leq h1/(2 \times P_1) \leq$ about 1.35.

16. The display device of claim 15, wherein the first curved portion is in the form of an oval.

17. The display device of claim 16, wherein a ratio of a length of a long axis of the oval to a length of a short axis of the oval is about 2.2 to about 3.5.

18. The display device of claim 14, wherein each of a second linear portion of each prism of the prism pattern is at an angle of about 40 degrees to about 55 degrees with respect to a virtual horizontal line which connects an end of one of the second linear portions to an end of the other one of the second linear portions.

* * * * *